(12) United States Patent
Einola et al.

(10) Patent No.: US 7,231,046 B1
(45) Date of Patent: Jun. 12, 2007

(54) METHOD FOR CONTROLLING CONNECTIONS TO A MOBILE STATION

(75) Inventors: Heikki Einola, Espoo (FI); Jaakko Rajaniemi, Helsinki (FI); Tony Hulkkonen, Helsinki (FI); Juha Bäck, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/868,107

(22) PCT Filed: Dec. 7, 1999

(86) PCT No.: PCT/FI99/01010

§ 371 (c)(1),
(2), (4) Date: Oct. 12, 2001

(87) PCT Pub. No.: WO00/36860

PCT Pub. Date: Jun. 22, 2000

(30) Foreign Application Priority Data

Dec. 16, 1998 (FI) ......................................... 982727
Apr. 6, 1999 (FI) ......................................... 990757

(51) Int. Cl.
*H04L 9/00* (2006.01)
(52) U.S. Cl. ..................... 380/270; 380/42; 380/247; 370/466; 370/468
(58) Field of Classification Search ............... 713/200, 713/201, 150, 169; 380/270, 44, 23, 45; 455/426, 432; 379/214
See application file for complete search history.

(56) References Cited

U.S. PATENT DOCUMENTS

| | | | | |
|---|---|---|---|---|
| 5,199,069 A | * | 3/1993 | Barrett et al. | 380/28 |
| 5,237,612 A | * | 8/1993 | Raith | 380/247 |
| 5,325,419 A | * | 6/1994 | Connolly et al. | 455/435.1 |
| 5,537,474 A | * | 7/1996 | Brown et al. | 380/248 |
| 5,555,553 A | * | 9/1996 | Jonsson | 379/214.01 |
| 5,729,537 A | | 3/1998 | Billström | 370/329 |
| 5,878,036 A | | 3/1999 | Spartz et al. | 370/335 |
| 6,112,088 A | * | 8/2000 | Haartsen | 455/437 |
| 6,125,122 A | * | 9/2000 | Favichia et al. | 370/466 |
| 6,167,513 A | * | 12/2000 | Inoue et al. | 713/150 |
| 6,363,151 B1 | * | 3/2002 | Linder | 380/247 |
| 6,434,382 B2 | * | 8/2002 | Liu et al. | 455/422.1 |
| 6,584,310 B1 | * | 6/2003 | Berenzweig | 455/432.1 |
| 6,876,747 B1 | * | 4/2005 | Faccin et al. | 380/247 |
| 7,002,992 B1 | * | 2/2006 | Shaffer et al. | 370/468 |
| 7,079,656 B1 | * | 7/2006 | Menzel et al. | 380/283 |
| 2002/0052206 A1 | * | 5/2002 | Longoni | 455/453 |

FOREIGN PATENT DOCUMENTS

| | | |
|---|---|---|
| EP | 0779760 A1 | 6/1997 |
| EP | 779760 A1 * | 6/1997 |
| EP | 0869692 A1 | 10/1998 |

(Continued)

*Primary Examiner*—Nasser Moazzami
*Assistant Examiner*—Carl Colin
(74) *Attorney, Agent, or Firm*—Harrington & Smith, PC

(57) ABSTRACT

The present invention is a novel and improved method for managing in a single location the ciphering keys and algorithms used for encrypting or ciphering the communications of a specific mobile station with multiple core networks or core network entities. Further another aspect of the invention is that the management location is movable as the mobile station moves within the radio access network.

18 Claims, 6 Drawing Sheets

FOREIGN PATENT DOCUMENTS

| | | |
|---|---|---|
| EP | 0957651 A2 | 11/1999 |
| JP | 10-135945 | 5/1998 |
| WO | WO97/15161 | 4/1997 |
| WO | WO-98/09461 A1 | 3/1998 |
| WO | WO 9809468 A1 * | 3/1998 |
| WO | WO99/30524 | 6/1999 |
| WO | WO99/33299 | 7/1999 |

* cited by examiner

METHOD FOR CONTROLLING CONNECTIONS TO A MOBILE STATION

TECHNICAL FIELD OF THE INVENTION

The present invention relates to communication networks capable of ciphering and deciphering and especially to a method for managing keys in such communication networks.

BACKGROUND OF THE INVENTION

Radio transmission is by nature more prone to eavesdropping and fraud than fixed wire transmission. Listening to communications is easy and does not require access to special locations. The GSM cellular system has alleviated this problem by introducing authentication and encryption or ciphering. Next the GSM authentication and ciphering procedures are explained shortly in reference with FIG. 1. More details can be found for example in Mouly et. al.: "The GSM system for mobile communications".

FIG. 1 illustrates current GSM system incorporated with a general packet radio or GPRS network. The complete network comprises three different functional sub-networks, a Radio Access Network, a Circuit Switched or first core network, and a Packet Switched or second core network. The Radio access network comprises Base Station Controllers or BSC's 30 (only one is shown) and Base Stations or BS's 20. The first core network comprises Mobile Switching Centers with Visitor Location Register or MSC/VLR 40 and Home Location Register with Authentication Center or HLR/AuC 50. The first core network comprises additional MSC/VLR's and HLR/AuC's, which are not shown for the sake of simplicity. The second core network comprises Serving General packet Service Node or SGSN 60. The second core network comprises additional General packet Service Nodes or GSN's, which are not shown for the sake of simplicity. The both core networks may share a common Home Location Register with Authentication Center or HLR/AuC 50.

When a User Equipment UE (or Mobile Station MS) 10 accesses the first core network it registers itself in the MSC/VLR 40. After receiving a registration request or a service request from the mobile, MSC/VLR 40 transmits to HLR/AuC a request including IMSI to acquire authentication triplets consisting of RAND, SRES and Kc1. In GSM the MM or the mobility management protocol implements the functionality for the authentication. The triplets are of a predetermined length and calculated by using a secret key Ki, known only to the authentication center and the SIM card in the mobile. After receiving the triplets from HLR/AuC, the MSC/VLR sends the challenge, RAND, to the MS in an authentication request to authenticate that particular MS. As part of the successful registration, the MSC/VLR updates the location of the MS to HLR and downloads the subscriber data from HLR.

The mobile 10 has the secret key Ki in its SIM card. The secret key Ki is stored on subscription by the operator and is not visible for the users of the mobile or for any other party for that matter. It is identical to the secret key Ki stored in the Authentication Center. The secret key Ki is applied together with the random number RAND into a predetermined algorithm called A3 to produce a signed response SIZES. The mobile 10 then transmits a message containing SIZES to the MSC/VLR 40, which compares it with the SIZES received from the AuC. If the comparison is successful, the mobile 10 is authenticated and allowed to access the network. At the same time with calculating the SIZES, the mobile applies RAND and Ki to another predetermined algorithm called A8 to produce the ciphering key Kc1. If the authentication was successful and the network should so decide, all subsequent transmissions with the mobile 10 over the air interface are ciphered.

For this the MSC/VLR transmits the ciphering key Kc1 to the BSC which is in communication with the mobile 10, and the BSC subsequently delivers the Kc1 further to the BTS communicating with the MS and the ciphering or encryption takes place in the base station and the mobile according to yet another predetermined algorithm, for example A5. Once MSC/VLR has decided that ciphering will be used, the BSC makes a decision up on the actual algorithm. In GSM there are currently two ciphering algorithms to select from.

If the mobile wants to access the second core network it registers itself in the SGSN 60. The procedure for authentication is similar to the procedure with the first core network, with the exception that the ciphering key Kc2 is not transmitted to the base station (BSS part of the system) currently in communication with the mobile 10. In other words, the ciphering takes place in SGSN and in MS. The SGSN 60 retains the ciphering key Kc2 within itself and performs the ciphering.

Thus, the prior art system uses different ciphering keys for ciphering the communications with two different core networks and the ciphering is applied to two different radio connections as the radio channels used for communicating with MSC and SGSN are distinct. As a result, a GSM MS having simultaneous communications with both MSC and SGSN utilizes two ciphering keys on two different radio channels or connections having both their own independent control in the network.

The fact that the ciphering and the control of the ciphering takes place at different locations, may cause consistency problems. The fact that radio access network is not able to access the signalling messages of the second core network at all, may turn out to be problematic in future networks, when all radio recourses used by a specific user should be managed in conjunction in a system having two CN nodes controlling the ciphering. In this case, the radio resources reserved for simultanous connections to MSC and SGSN should be managed by a single entity in the radio access network part of the system, but still there would be two entities controlling the ciphering.

It is proposed that in UMTS there will be only one RRC or radio resource control protocol, controlling both the connection to the MSC and to the SGSN. If only one key is used at a time for both connections, the problem is, how to communicate to the other CN node that its key is not going to be used. Yet another problem, relates to handovers controlled by a CN entity.

It is therefore an object of the present invention to efficiently manage the ciphering keys and algorithms for ciphering and deciphering user data communicated between different core networks and a mobile station.

It is another object of the present invention to efficiently manage the ciphering keys and algorithms for ciphering and deciphering signalling data communicated between different core networks and a mobile station.

It is still another object of the present invention to efficiently transfer the ciphering parameters when the serving radio network controller is handed over to another radio network controller, which then becomes a new serving radio network controller.

SUMMARY OF THE INVENTION

The present invention is a novel and improved method for managing in a single location the ciphering keys and algorithms used for encrypting or ciphering the communications of a specific mobile station with multiple core networks or core network entities. Further another aspect of the invention is that the management location is movable as the mobile station moves within the radio access network.

The preferred embodiment of the present invention relates to a 3$^{rd}$ generation mobile network, for which abbreviations UMTS or WCDMA are used. The network is shown in FIG. 2. The network comprises multiple subnetworks. The radio access network or UTRAN (UMTS Terrestial Radio Access Network) comprises multiple Radio Network Controllers or RNC's 130 each of which controls multiple Base Stations or BS's 120. The first core network comprises a Mobile Switching Center with Visitor Location Register or MSC/VLR 140 and a Home Location Register with an Authentication Center or HLR/AuC 150. The first core network comprises additional MSC/VLR's and HLR/AuC's, which are not shown for the sake of simplicity. The second core network is a packet network and comprises Serving General packet Service Node or SGSN 160. The second core network comprises additional Gateway GPRS Support Nodes or GGSN's, which are not shown for the sake of simplicity. Note that the UTRAN may be connected to another operators core network or a third core network similar to the first core network.

Since the air interface access method is CDMA, the mobile 110 is capable of communicating with multiple base stations at the same time (called soft or diversity handover). When that occurs, all transmissions from the mobile 110 are directed to one RNC, called serving RNC or SRNC, in which the transmissions are combined into one transmission for further sending towards the intended core network. Also, the SRNC has the control over the radio connections.

In the preferred embodiment a mobile station establishes communication with one core network or core network entity or vice versa. In the establishment the network requests mobile to authenticate itself as explained above. At the same time with the authentication the mobile and the network (or CN node) calculate identical ciphering keys Kc1. In the preferred embodiment of the invention the core network or core network entity, which calculated the ciphering key does not start ciphering user data or signalling messages but generates and transmits a message comprising the key and data indicative of the algorithm to be used to a ciphering controller 180, which is preferably located in the serving radio network controller. The ciphering controller receives said message and starts ciphering the data and signalling messages flowing from the core network towards to mobile station and to decipher the data and signalling messages flowing from the mobile to the core network.

In the preferred embodiment of the invention another core network or network entity may establish communication with the mobile station or vice versa while the communication with the first core network is still active. The second core network or network entity authenticates the mobile and second ciphering keys Kc2 are calculated. Then, as described above, the second core network generates and transmits a second message comprising the second key and data indicative of the algorithm to be used with the second key to the ciphering controller. The ciphering controller receives said second message and compares the first and second ciphering keys and the related algorithms. If the first and second ciphering keys and the related algorithms are equally reliable, the ciphering controller ciphers and deciphers data and signalling messages to and from the first and second core networks with the key and algorithm it was using already. This is illustrated in FIG. 3. However, if the second ciphering key and it's related algorithm provide improved encryption or it is desirable not to use the same key any more (even if the quality or strength of the ciphering were the same) the ciphering controller starts using the second key and it's related algorithm for the communication with the first core network as well. This is illustrated in FIG. 4. The scenario presented in FIG. 3 may result in that the same key is used for a very long time, as the activity may be chained between MSC and SGSN. The need or desire to change the key will result in that ciphering control will generate and transmit MS a message commanding it to act accordingly.

In another embodiment of the present invention the respective different keys are used for ciphering user data in different communications but the key and it's related algorithm with higher ciphering capabilities are used for ciphering the signalling messages to and from both core networks.

In yet another embodiment, after receiving the message containing the second ciphering key Kc2, the ciphering control acknowledges said message with another message containing information indicative of the selected ciphering key and algorithm. The communication of the key in use into the second CN node (possessing Kc2) may also take place in the reception of initial message as part of the COMPLETE LAYER 3 INFO message. By doing so, the second CN will become aware immediately that the radio connection for signalling is already ciphered and as a result there would be no need to commend ciphering on.

In another embodiment, there is only one entity controlling the ciphering in CN. This approach is illustrated in FIG. 6. In this case there is no need for managing of the keys in RNC as described above. As a result, the situation is from the RNC point of view the same as in the prior art system GSM. However, in the CN side the situation is new, as a single entity is managing both the services (and protocols) offered by the MSC and SGSN. In such a configuration, the system is characterized with that the ciphering belonging to connections or services belonging inherently to MSC and SGSN in GSM are managed by the said single CN entity, which is using a single signalling flow between the radio access network and core network, i.e., over Iu-interface.

In another embodiment the is an interface between the two ciphering control entites in CN providing the required coordination. In practice, there could be an interface called Gs between the MSC and SGSN. The Gs as such is present in the prior art GSM system, but it does not contain functionality to coordinate the ciphering keys. FIG. 7 illustrates one implementation or realization of the coordination provided by the enhanced Gs interface. The activity enquiry response may contain also other data such as SRNC ID to avoid paging in MT case in non-serving RNCs, but belonging to LA/RA the terminal in currently registered in.

In the preferred embodiment of the present invention it is possible that the communications to the mobile station are rerouted via another serving radio network controller. Should this occur, the parameters used for ciphering and deciphering (along with other parameters required to establish the communication via the target controller) need to be transferred to the new location of the ciphering controller via CN. This is done by signalling the parameters or info on them transparently through the corresponding core networks. Alternatively this may be done by signalling the parameters over Iu interfaced between radio network controllers.

BRIEF DESCRIPTION OF THE DRAWINGS

The invention is described in more detail in the following with reference to the accompanying drawings, of which

Same reference numerals are used for similar entities in the figures.

DETAILED DESCRIPTION

The ciphering is likely to be done within UTRAN in UMTS. In the two MM option there are two entities, i.e., MSC and SGSN, which may request ciphering in the radio interface.

It is assumed that in UMTS the ciphering key and the allowed ciphering algorithms are supplied by CN domains to the UTRAN usually in the beginning of the connection. Receipt of the ciphering command message at the UTRAN will cause the generation of a radio interface ciphering command message and, if applicable, invoke the encryption device and start data stream ciphering. The CN domain is noted if the ciphering is executed successfully in the radio interface and the selected ciphering algorithm.

When new connection is established from other CN domain, which is not having any connection to the UE, the new CN domain also supplies the ciphering key and the ciphering algorithms allowed to use to UTRAN in the beginning of the connection. This is due to the fact CN domains are independent from each other, in the sense of ciphering.

If it is assumed that only one ciphering key and one ciphering algorithm are used for all connections, this leads to a situation, in which there are (two) more than one ciphering keys supplied from CN domains and only one of them is used.

Figure 1:
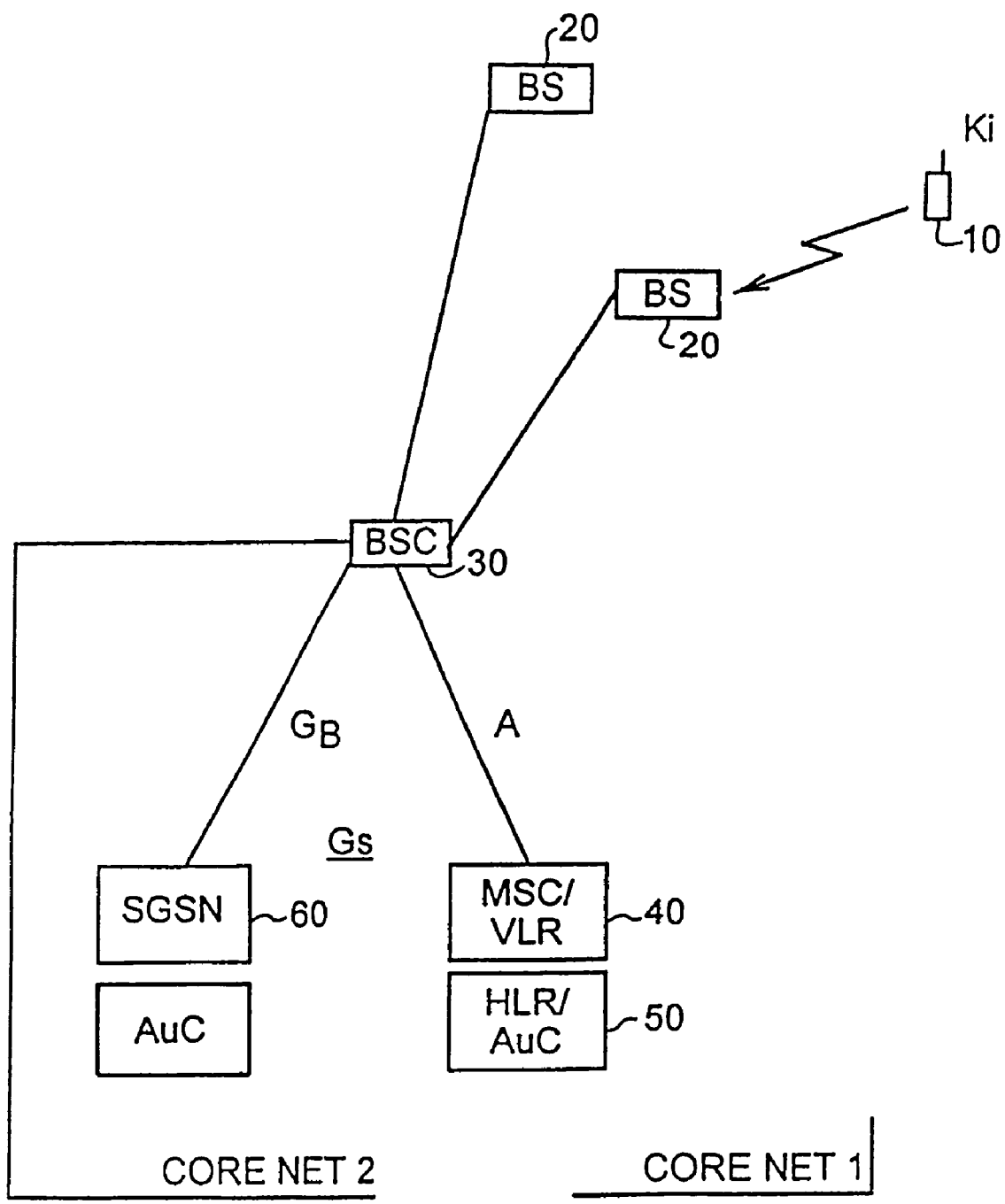
FIG. 1 is an illustration of prior art mobile communication system.
Figure 2:
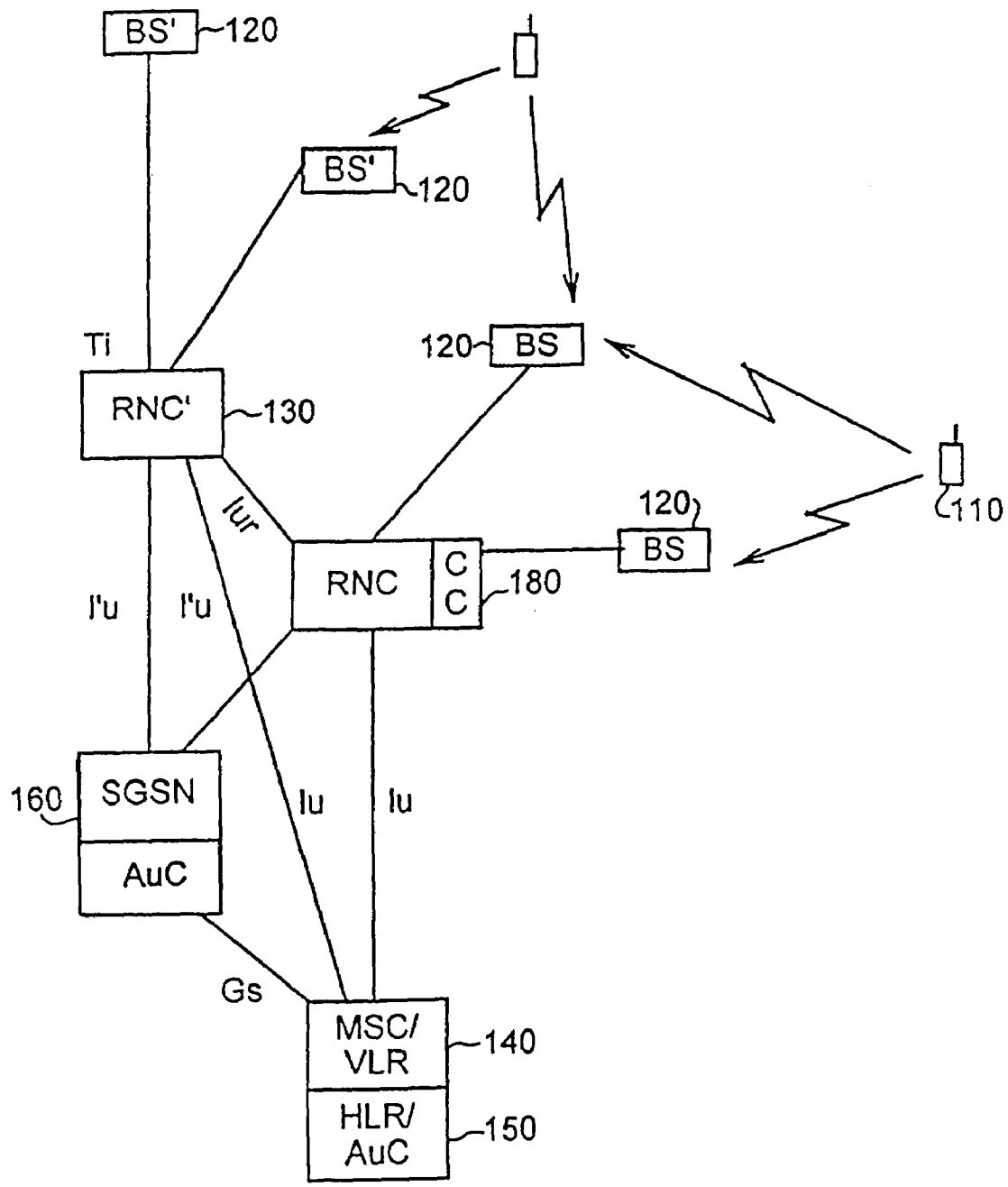
FIG. 2 is an illustration of the UMTS network of the preferred embodiment of the present invention.
Figure 3:
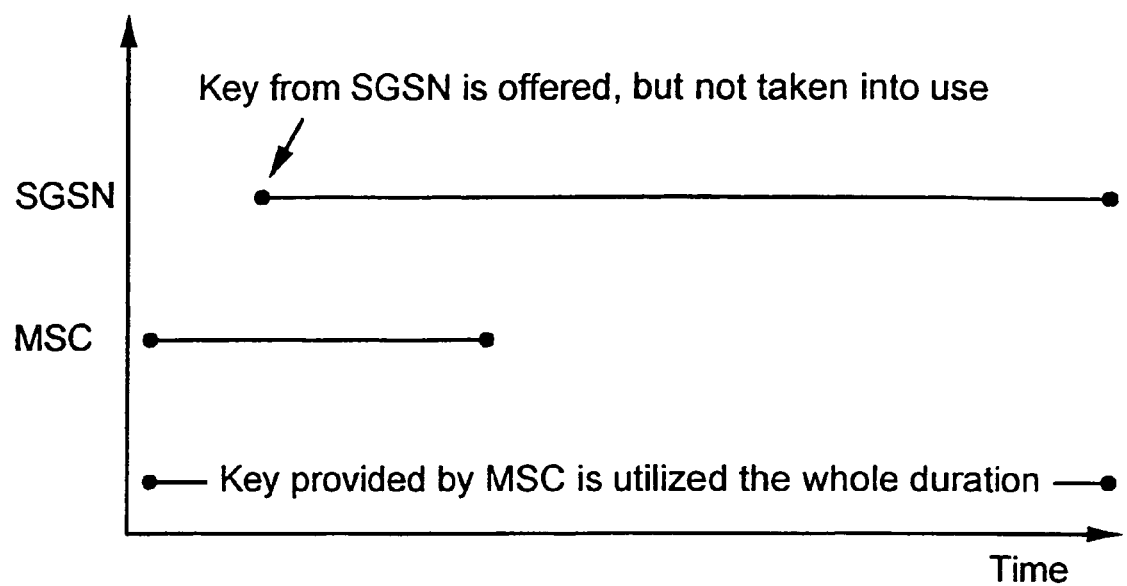
FIG. 3 illustrates the selection of one ciphering key for all communication.

To handle this situation, UTRAN must select either one of the ciphering keys. If there are no differences between the ciphering requirements requested by two CN domains or there is no desire to change the key then, e.g., the first ciphering key and the algorithm is maintained as shown in FIG. 3.

As a result of the selection of the ciphering key between two different CN domains (if both CN domains have active connection(s) to the UE) either one of the CN domains does not know the correct ciphering key used for the connection(s). Only UTRAN and UE know the correct ciphering key used.

It may be required to use one ciphering key for, e.g., one radio access bearer. Different user plane bearers are ciphered by different ciphering keys supplied by the single CN domain respectly. This means that, e.g., for two calls via MSC, two keys would be used for the data streams. However, in the control plane only one ciphering key is used and therefore in the control plane there must be coordinated between ciphering keys supplied by CN domains or domain.

The coordination in the control plane is similar to what is presented for one ciphering key used in UTRAN. In the control plane, UTRAN must select either one of the ciphering keys supplied from CN domains if both CN domains are active or from a CN domain in case more than one bearers were in use.

In GSM, when inter-BSC handover is performed, MSC sends the ciphering key and allowed algorithms to the target BSC in the BSSMAP HANDOVER REQUEST message. In GPRS, because the SGSN performs the ciphering, the inter-BSC handover does not cause any need for the ciphering key management.

For UMTS, the GSM approach is not applicable on the serving RNC (SRNC) relocation, because CN domains do not necessary know the correct ciphering key used as it is described above. The solution is to relay info on ciphering transparently via the CN in SRNC relocation.

Figure 4:
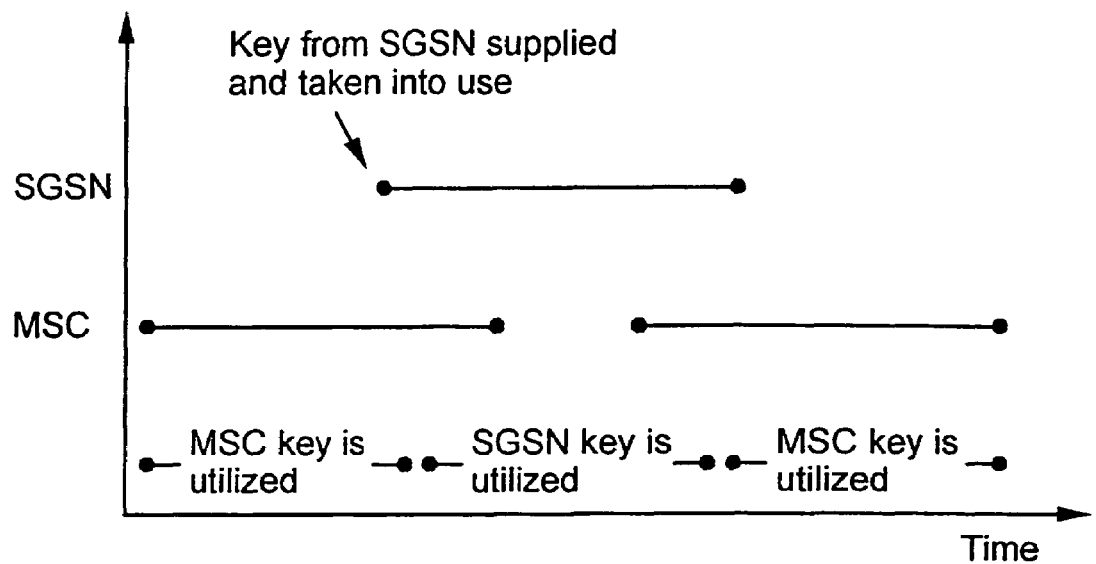
FIG. 4 illustrates the case when ciphering key is changed during the communication.
Figure 6:
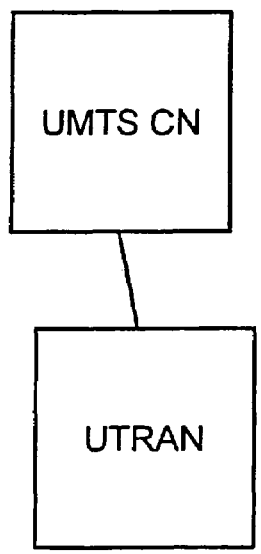
FIG. 6 illustrates the case having only one core network ciphering entity.
Figure 5:
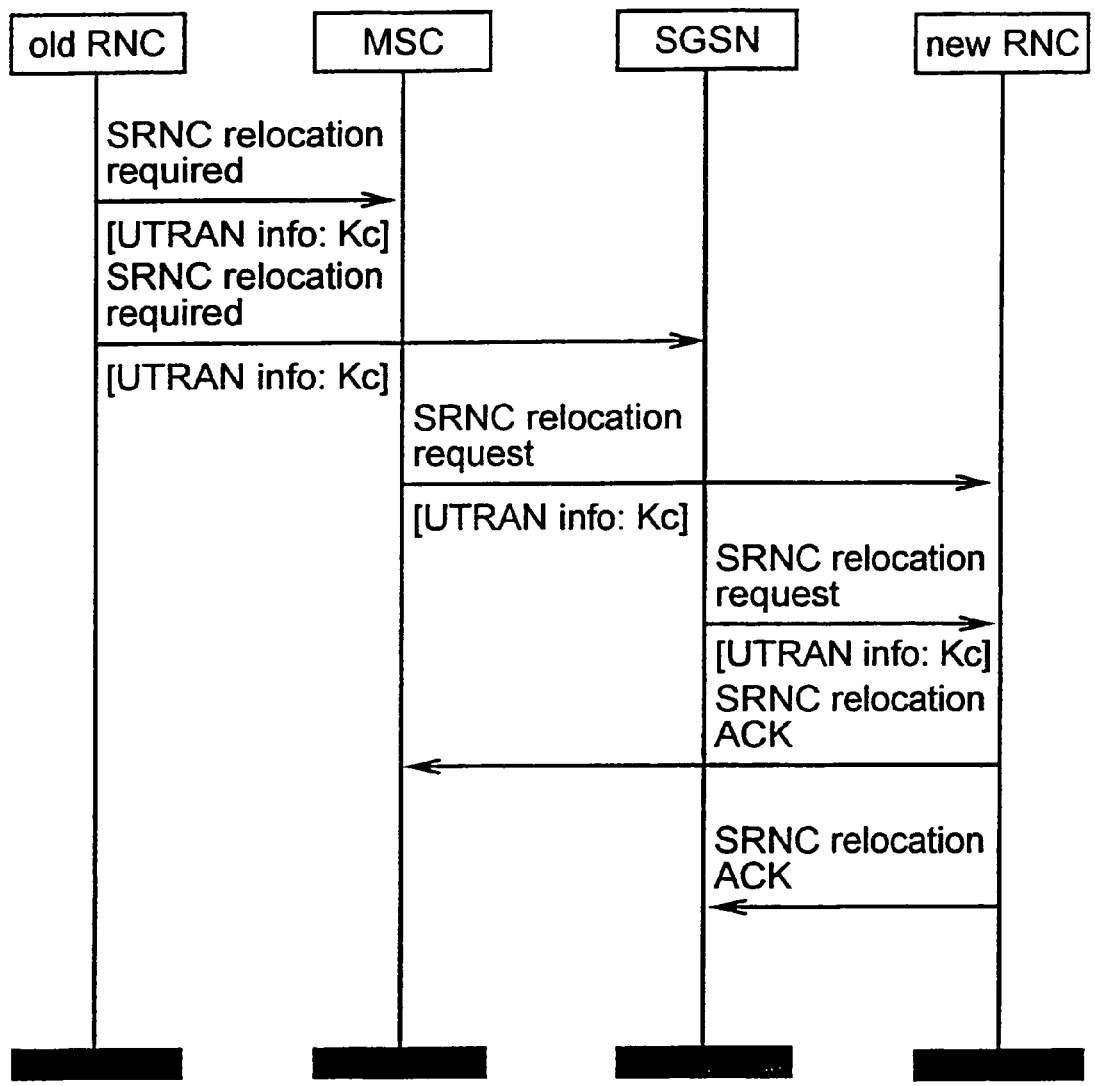
FIG. 5 illustrates the signalling sequence in SRNC relocation.
Figure 7:
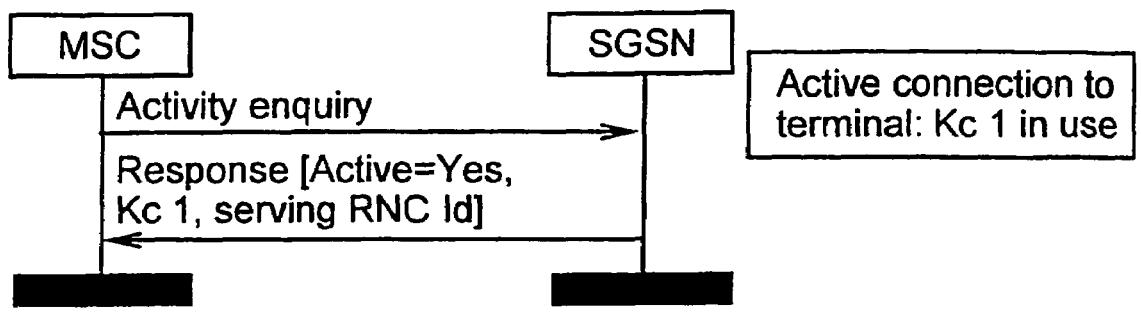
FIG. 7 illustrates the activity enquiry from first core network entity to second core network entity.

FIG. 4 describes the ciphering key signalling in an inter-RNC handover. The ciphering key is transferred in the transparent (to CN) UTRAN information field from the source RNC to the target RNC in the RANAP SRNC REQUIRED and RANAP SRNC REQUEST messages. In this way the correct ciphering key is transferred to the target RNC.

In the handover from UMTS to GSM, the ciphering key cannot be transferred transparently like it is proposed for UMTS. The CN (or IWU) has to build the BSSMAP HO REQUEST message, having the ciphering key from the MSC. 2G-SGSN receives its ciphering key from the old 3G-SGSN via Gn-interface as it is done in GPRS.

If the ciphering keys used in UMTS are different compared to GSM, e.g., the ciphering key length is different, both MSC and SGSN ciphering keys must be changed in UMTS-GSM handover.

In GSM, the A-interface BSSMAP supports a transparent field in the BSSMAP HO REQUIRED and HO REQUEST messages, which allows to utilize the proposed solution also GSM CN-connected to the UTRAN.

Figure 8:
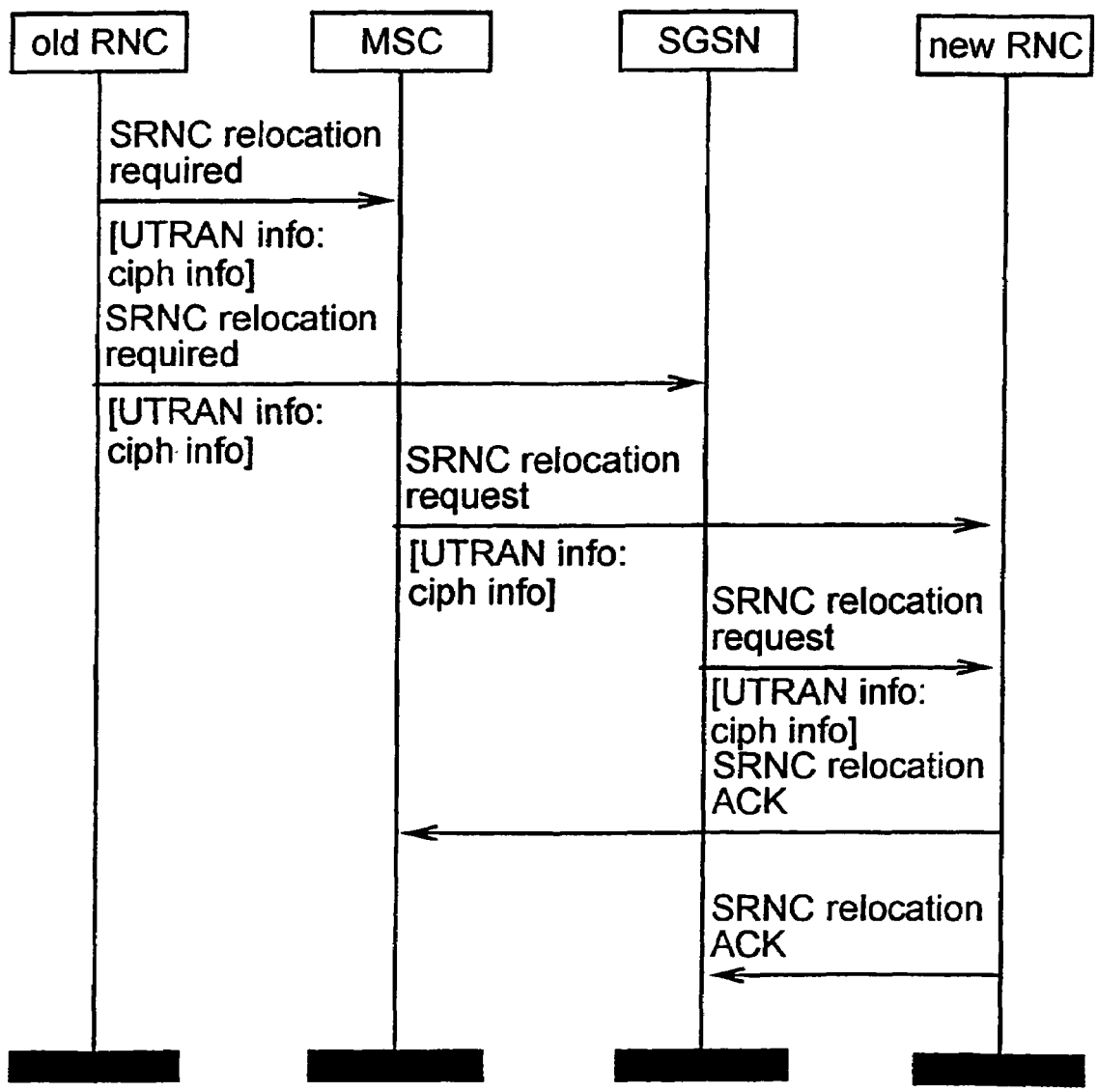
FIG. 8 illustrates an alternative signalling sequence in SRNC relocation.

An alternative signalling is presented in FIG. 8. In this case the keys are managed like in MSC in GSM (described above), but the transparent info contains indication on, which key is actually in use. For example, in case the key supplied by SGSN was in use in source, the target would receive two keys together with an indication that the SGSN key is in use. The advantage of this alternative is the similarity with GSM, which makes handover with GSM more easy with GSM as the principle on key management in CN (actually only MSC) is the same in both GSM and UMTS.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

The invention claimed is:

1. A communication network comprising a user equipment, an access network and a plurality of core networks, wherein said communication network is arranged to:
   communicate separate ciphering parameters to said access network from said at least two of said core networks; and
   select one of said separate ciphering parameters and use the selected ciphering parameter for ciphering at least both a communication between said user equipment and a first core network of said plurality of core networks and a communication between said user equipment and a second core network of said plurality of core networks,
   wherein said user equipment is configured to be simultaneously in communication with at least two of said plurality of core networks.

2. A communication network according to claim 1, further arranged to
   cipher said communications between said user equipment and said at least two of said plurality of core networks with said selected one of said separate ciphering parameters.

3. A communication network according to claim 2, wherein said communications are signaling messages.

4. A communication network according to claim 2, wherein said communications comprise signaling messages and user data.

5. A communication network according to claim 1 wherein said ciphering parameter comprises at least one of a ciphering key or a ciphering algorithm.

6. A method comprising:
   receiving at an access network separate ciphering parameters from at least a first core network and a second core network of a plurality of core networks; and
   selecting one of said separate ciphering parameters and using the selected ciphering parameter for ciphering at least both a communication between a user equipment and said first core network of said plurality of core networks via said access network and a simultaneous communication between said user equipment and said second core network of said plurality of core networks via said access network.

7. A method according to claim 6 further comprising ciphering said communications between said user equipment and said at least two of said plurality of core networks with said selected one of said separate ciphering parameters.

8. A method of ciphering according to claim 7, wherein said communications are signaling messages.

9. A method of ciphering according to claim 7, wherein said communications comprise signaling messages and user data.

10. A method according to claim 6, wherein said ciphering parameter comprises at least one of a ciphering key or a ciphering algorithm.

11. A method according to claim 6, wherein said access network comprises a plurality of entities dedicated for managing the ciphering of communications with user equipments located in a geographical area allocated to said respective entities,
    and that when said user equipment moves from a geographical area allocated to a first ciphering managing entity to a geographical area allocated to a second ciphering managing entity, said first ciphering managing entity communicates used ciphering parameters to said second ciphering managing entity by signaling over said at least two of said plurality of core networks.

12. An access network which is arranged to:
   receive separate ciphering parameters from at least two of a plurality of core networks; and
   select one of said separate ciphering parameters and use the selected ciphering parameter for ciphering at least both a communication between a user equipment and a first core network of said plurality of core networks via said access network and a simultaneous communication between said user equipment and a second core network of said plurality of core networks via said access network.

13. A device which is arranged to:
   receive separate ciphering parameters from at least two of a plurality of core networks; and
   select one of said separate ciphering parameters and use the selected ciphering parameter for ciphering at least both a communication between a user equipment and a first core network of said plurality of core networks via an access network and a simultaneous communication between said user equipment and a second core network of said plurality of core networks via said access network, wherein said device is one of an access network element and a ciphering controller.

14. A device according to claim 13, further arranged to cipher said communications between said user equipment and said at least two of said plurality of core networks with said selected one of said separate ciphering parameters.

15. A device according to claim 14, wherein said communications are signaling messages.

16. A device according to claim 14, wherein said communications comprise signaling messages and user data.

17. A device according to claim 13, wherein said ciphering parameter comprises at least one of a ciphering key or a ciphering algorithm.

18. A device according to claim 13, further comprising a radio network controller in the access network element.

* * * * *